United States Patent
Ozawa et al.

(10) Patent No.: US 11,642,874 B2
(45) Date of Patent: May 9, 2023

(54) LAMINATE AND METHOD FOR ITS PRODUCTION

(71) Applicant: AGC Inc., Chiyoda-ku (JP)

(72) Inventors: Norio Ozawa, Chiyoda-ku (JP); Tomoya Hosoda, Chiyoda-ku (JP); Takashi Sato, Chiyoda-ku (JP)

(73) Assignee: AGC Inc., Chiyoda-ku ( * ) Notice: Subject to any disclaimer, the term of this patent is extended or adjusted under 35 U.S.C. 154(b) by 25 days.

(21) Appl. No.: 16/924,299

(22) Filed: Jul. 9, 2020

(65) Prior Publication Data

US 2020/0338872 A1 Oct. 29, 2020

Related U.S. Application Data

(63) Continuation of application No. PCT/JP2019/015683, filed on Apr. 10, 2019.

(30) Foreign Application Priority Data

Apr. 16, 2018 (JP) .............................. JP2018-078705
Jul. 25, 2018 (JP) .............................. JP2018-139612

(51) Int. Cl.
*B32B 27/08* (2006.01)
*B32B 5/02* (2006.01)
(Continued)

(52) U.S. Cl.
CPC .............. *B32B 27/08* (2013.01); *B32B 5/024* (2013.01); *B32B 5/26* (2013.01); *B32B 27/34* (2013.01);
(Continued)

(58) Field of Classification Search
CPC .......... B32B 27/08; B32B 5/024; B32B 5/26; B32B 27/34; B32B 2250/05;
(Continued)

(56) References Cited

U.S. PATENT DOCUMENTS

| 2018/0050516 A1* | 2/2018 | Hosoda ................... B32B 27/00 |
| 2018/0154614 A1 | 6/2018 | Hosoda et al. |
| 2018/0282500 A1* | 10/2018 | Hosoda ................... B32B 15/14 |

FOREIGN PATENT DOCUMENTS

| JP | WO 2018/016644 A1 | 1/2018 | |
| WO | WO-2016181936 A1 * | 11/2016 | ............ C09J 127/18 |

(Continued)

OTHER PUBLICATIONS

International Search Report dated Jun. 25, 2019 in PCT/JP2019/015683 filed Apr. 10, 2019, citing documents AA-AB, AO-AP and AR therein, 2 pages

*Primary Examiner* — Alicia J Sawdon
*Assistant Examiner* — Laura B Figg
(74) *Attorney, Agent, or Firm* — Element IP, PLC

(57) ABSTRACT

The purpose of the present invention is to provide a laminate being excellent in chemical resistance, wear resistance, vibration absorption properties and flame resistance, and having high mechanical strength; and a method for its production. A laminate 1 comprises a fiber-reinforced resin layer 20 which comprises a reinforcing fiber base material and a resin component containing at least 50 vol % of a specific fluororesin, wherein the ratio of the reinforcing fiber base material to the total volume of the reinforcing fiber base material and the resin component is from 0.30 to 0.70, and a specific substrate 10, wherein at least one outermost layer is the fiber-reinforced resin layer 20, and the ratio of the total thickness of the fiber-reinforced resin layer 20 to the total thickness of the substrate 10 is from 1/99 to 30/70.

17 Claims, 1 Drawing Sheet

(51) Int. Cl.
  *B32B 5/26* (2006.01)
  *B32B 27/34* (2006.01)
  *C08J 5/24* (2006.01)
(52) U.S. Cl.
  CPC ............ *C08J 5/243* (2021.05); *B32B 2250/05* (2013.01); *B32B 2250/40* (2013.01); *B32B 2260/023* (2013.01); *B32B 2260/046* (2013.01); *B32B 2262/106* (2013.01)
(58) Field of Classification Search
  CPC .......... B32B 2250/40; B32B 2260/023; B32B 2260/046; B32B 2262/106; C08J 5/24
  See application file for complete search history.

(56) References Cited

FOREIGN PATENT DOCUMENTS

| | | | |
|---|---|---|---|
| WO | WO 2017/030190 A1 | 2/2017 | |
| WO | WO 2017/122735 A1 | 7/2017 | |
| WO | WO 2017/122740 A1 | 7/2017 | |
| WO | WO-2017122740 A1 * | 7/2017 | ........... B29C 70/506 |

* cited by examiner

LAMINATE AND METHOD FOR ITS PRODUCTION

TECHNICAL FIELD

The present invention relates to a laminate and a method for its production

BACKGROUND ART

A fiber-reinforced molded product has high strength and is light in weight, and thus, it is used in a wide range of applications e.g. vehicles (automobiles, railway vehicles, etc.), transportation equipments such as aircrafts, building members, electronic equipments, etc. In the production of a fiber-reinforced molded product, a prepreg having a reinforcing fiber base material impregnated with a matrix resin is used. As the matrix resin, a thermosetting resin or a thermoplastic resin has been used. It has also been proposed to use a fluororesin as the matrix resin.

Patent Document 1 discloses a fiber-reinforced molded product (laminate) obtained by molding a laminated material in which a fluororesin film is laminated as an outermost layer on one or more layers of prepreg obtained by impregnating a reinforcing fiber base material with a thermosetting resin or a thermoplastic resin.

Patent Document 2 discloses a fiber-reinforced molded product (laminate) obtained by molding a laminated material in which a prepreg having a reinforcing fiber base material impregnated with a thermoplastic resin and a prepreg having a reinforcing fiber base material impregnated with a fluororesin, are alternately laminated, and a prepreg impregnated with a fluororesin is used as the outermost layer.

Patent Document 3 discloses a fiber-reinforced molded product (laminate) obtained by molding a laminated material in which a plurality of prepregs having a reinforced fiber base material impregnated with a mixed resin comprising a thermoplastic resin as the main component and a fluororesin, are laminated.

PRIOR ART DOCUMENTS

Patent Documents

Patent Document 1: WO2017/030190
Patent Document 2: WO2017/122740
Patent Document 3: WO2017/122735

DISCLOSURE OF INVENTION

Technical Problem

However, the laminate of Patent Document 1 may not have sufficient wear resistance in some cases. The laminate of Patent Document 2 may not have sufficient mechanical strength in some cases. The laminate of Patent Document 3 may not have sufficient chemical resistance and wear resistance in some cases.

It is an object of the present invention to provide a laminate being excellent in chemical resistance, wear resistance, vibration absorption and flame retardancy and having high mechanical strength, and a method for its production.

Solution to Problem

The present invention has the following construction.
[1] A laminate comprising
a fiber-reinforced resin layer which comprises a reinforcing fiber base material and a resin component containing at least 50 vol % of the following fluororesin, wherein the ratio of the volume of the reinforcing fiber base material to the total volume of the reinforcing fiber base material and the resin component is from 0.30 to 0.70, and
a substrate which comprises metal, paper, glass, or a resin component containing more than 50 vol % of the following non-fluororesin,
wherein at least one outermost layer is the fiber-reinforced resin layer, and
the ratio of the total thickness of the fiber-reinforced resin layer to the total thickness of the substrate is from 1/99 to 30/70,
Fluororesin: a melt-moldable fluororesin having at least one type of functional group selected from the group consisting of a carbonyl group-containing group, a hydroxy group, an epoxy group, an amide group, an amino group and an isocyanate group, and having a melting point of from 100 to 325° C.,
Non-fluororesin: a cured product of a thermosetting resin or a thermoplastic resin, containing no fluorine atom.
[2] The laminate according to [1], wherein the melting point of the fluororesin is at least 150° C. and lower than 260° C.
[3] The laminate according to [1], wherein the melting point of the fluororesin is at least 260° C. and lower than 325° C.
[4] The laminate according to any one of [1] to [3], wherein the fluororesin is the following fluorinated polymer,
Fluorinated polymer: a fluorinated polymer having units based on tetrafluoroethylene or chlorotrifluoroethylene, units based on a cyclic hydrocarbon monomer having an acid anhydride group, and units based on a fluorinated monomer (but excluding tetrafluoroethylene and chlorotrifluoroethylene).
[5] The laminate according to any one of [1] to [4], wherein reinforcing fibers of the reinforcing fiber base material contained in the fiber-reinforced resin layer are selected from the group consisting of carbon fibers, glass fibers and aramid fibers.
[6] The laminate according to any one of [1] to [5], wherein the substrate further contains reinforcing fibers.
[7] The laminate according to any one of [1] to [6], wherein the substrate is a resin substrate composed solely of a thermoplastic resin containing no fluorine atom, a fiber-reinforced resin substrate comprising reinforcing fibers and a resin component containing more than 50 vol % of a cured product of a thermosetting resin containing no fluorine atom, or a fiber-reinforced resin substrate comprising reinforcing fibers and a resin component containing more than 50 vol % of a thermoplastic resin containing no fluorine atom.
[8] The laminate according to any one of [1] to [7], wherein the thermoplastic resin containing no fluorine atom is selected from the group consisting of a polyamide, a polyarylene sulfide resin, a polyketone, a polyetherketone, a polyetheretherketone, a polyetherketoneketone, a polyethernitrile, a modified polyphenylene ether, a thermoplastic polyimide, a polyamideimide, a polyetherimide, a polysulfone, a polyethersulfone and a polyarylate.
[9] The laminate according to any one of [1] to [7], wherein the thermosetting resin containing no fluorine atom is selected from the group consisting of an epoxy resin, a cyanate ester resin, an unsaturated polyester resin, a vinyl ester resin, a phenol resin, a urea melamine resin, a polyimide and a bismaleimide resin.

[10] The laminate according to any one of [6] to [9], wherein the reinforcing fibers contained in the substrate are selected from the group consisting of carbon fibers, glass fibers and aramid fibers.

[11] The laminate according to any one of [1] to [10], wherein the structure of the substrate is a columnar shape, a cylindrical shape or a honeycomb structure.

[12] The laminate according to any one of [1] to [11], wherein the adhesive strength between the fiber-reinforced resin layer and the substrate is at least 5 N/cm.

[13] A method for producing a laminate, which comprises laminating a prepreg having a reinforcing fiber base material impregnated with a resin component containing at least 50 vol % of the following fluororesin, wherein the ratio of the volume of the reinforcing fiber base material to the total volume of the reinforcing fiber base material and the resin component is from 0.30 to 0.70, and a substrate comprising metal, paper, glass or a resin component containing more than 50 vol % of the following non-fluororesin, so that the prepreg is disposed on at least one outermost layer, and the ratio of the total thickness of the prepreg to the total thickness of the substrate becomes to be from 1/99 to 30/70, and heating and pressing them, Fluororesin: a melt-moldable fluororesin having at least one type of functional group selected from the group consisting of a carbonyl group-containing group, a hydroxy group, an epoxy group, an amide group, an amino group and an isocyanate group, and having a melting point of from 100 to 325° C., Non-fluororesin: an uncured thermosetting resin or thermoplastic resin containing no fluorine atom.

[14] The method for producing a laminate according to [13], wherein the surface of the prepreg in contact with the substrate is plasma-treated.

[15] A vibration-damping member made of the laminate as defined in any one of [1] to [12].

Advantageous Effects of Invention

According to the present invention, it is possible to provide a laminate being excellent in chemical resistance, wear resistance, vibration absorption and flame retardancy and having high mechanical strength, and a method for its production.

DESCRIPTION OF EMBODIMENTS

Figure 1:
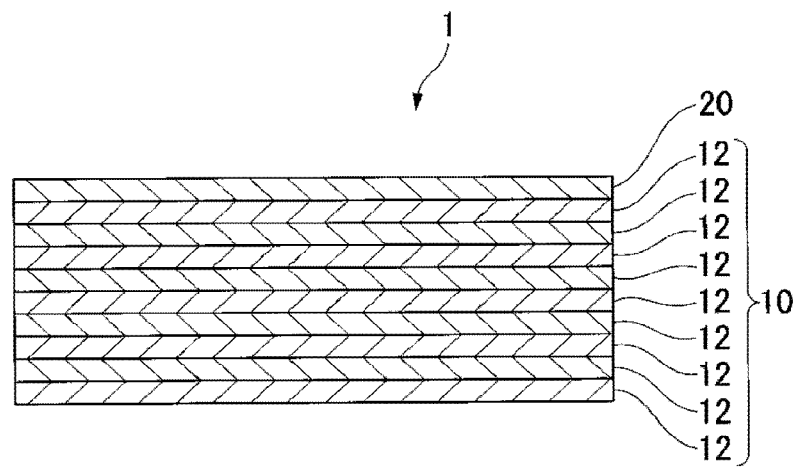
FIG. 1 is a cross-sectional view showing an example of the laminate of the present invention.

The following terms have the following meanings.

The "melting point" means the temperature corresponding to the maximum value of the melting peak as measured by a differential scanning calorimetry (DSC) method.

The term "melt moldable" means to exhibit melt flowability.

"Showing melt flowability" means that at a temperature higher by at least 20° C. than the melting point of the resin under a load of 49 N, there is a temperature at which the melt flow rate becomes to be from 0.01 to 1,000 g/10 minutes.

The "melt flow rate" means a melt mass flow rate (MFR) as defined in JIS K7210:1999 (ISO 1133:1997).

"D50 of powder" is a volume-based cumulative 50% diameter obtained by a laser diffraction/scattering method. That is, a particle size distribution is measured by a laser diffraction/scattering method, and a cumulative curve is obtained with the total volume of a group of particles being 100%, whereby D50 is a particle diameter at a point where the cumulative volume becomes 50% on the cumulative curve. Likewise, "D10 of powder", "D90 of powder", and "D100 of powder" are a volume-based cumulative 10% diameter, a volume-based cumulative 90% diameter, and a volume-based cumulative 100% diameter.

A "unit based on a monomer" is a generic term for an atomic group directly formed by polymerization of one molecule of a monomer and an atomic group obtainable by chemically converting a part of said atomic group. In the present specification, a unit based on a monomer is simply referred to also as a monomer unit.

A "monomer" is a compound having a polymerizable unsaturated bond such as a polymerizable double bond.

An "acid anhydride group" means a group represented by —C(=O)—O—C(=O)—.

[Laminate]

The laminate of the present invention comprises fiber-reinforced resin layer A as described below and substrate B as described below.

(Fiber-Reinforced Resin Layer A)

The fiber-reinforced resin layer A is a fiber-reinforced resin layer which comprises a reinforcing fiber base material and a resin component (hereinafter referred to also as "resin component a") containing at least 50 vol % of fluororesin F as described later, wherein the ratio $Q_A$ of the volume of the reinforcing fiber base material to the total volume of the reinforcing fiber base material and the resin component a is from 0.30 to 0.70.

As the reinforcing fibers to be used for the reinforcing fiber base material of the fiber-reinforced resin layer A, inorganic fibers, metal fibers or organic fibers may be exemplified.

As the inorganic fibers, carbon fibers, graphite fibers, glass fibers, silicon carbide fibers, silicon nitride fibers, alumina fibers, silicon carbide fibers or boron fibers may be exemplified.

As the metal fibers, aluminum fibers, brass fibers or stainless fibers may be exemplified.

As the organic fibers, aromatic polyamide fibers, polyaramid fibers, polyparaphenylenebenzoxazole (PBO) fibers, polyphenylene sulfide fibers, polyester fibers, acrylic fibers, nylon fibers, or polyethylene fibers may be exemplified.

From the standpoint of availability, the reinforcing fibers are preferably at least one type selected from the group consisting of carbon fibers, glass fibers and aramid fibers.

The reinforcing fibers may be opened or may not be opened. The reinforcing fibers may be surface-treated. As the reinforcing fibers, one type may be used alone, or two or more types may be used in combination.

As the reinforcing fibers, continuous long fibers having a length of at least 10 mm are preferred. The reinforcing fibers do not have to be continuous over the entire length in the length direction or over the entire width in the width direction of the reinforcing fiber base material, and may be divided in the middle.

The mode of the reinforcing fiber base material is not particularly limited, and a reinforcing fiber bundle composed of a plurality of reinforcing fibers, a reinforcing fiber fabric formed by weaving reinforcing fibers, a reinforcing fiber sheet in which reinforcing fibers are aligned in one direction, a reinforcing fiber nonwoven fabric, or a combinations of these may be exemplified. As the reinforcing fiber base material, a reinforcing fiber woven fabric, a reinforcing fiber sheet in which reinforcing fibers are aligned in one direction, and a reinforcing fiber nonwoven fabric, are preferred from the viewpoint of strength physical properties of the obtainable fiber-reinforced molded product.

The thickness of the reinforcing fiber base material is preferably from 10 to 500 μm, more preferably from 20 to 300 μm. When the thickness of the reinforcing fiber base material is at least the lower limit value in the above range, the handling efficiency of the reinforcing fiber base material will be excellent. When the thickness of the reinforcing fiber base material is at most the upper limit value in the above range, the impregnation property at the time of producing a fiber-reinforced molded product will be excellent.

To the surface of carbon fibers, coating (referred to also as sizing) to facilitate the handling of the fibers, is applied. In the present invention, both carbon fibers having coating applied, and carbon fibers having the coating agent removed, may be used.

The resin component a of the fiber-reinforced resin layer A contains the fluororesin F as an essential component, and may contain other resins other than the fluororesin F, as the case requires.

The fluororesin F is a melt-moldable fluororesin which has at least one type of functional group (hereinafter referred to also as "functional group f") selected from the group consisting of a carbonyl group-containing group, a hydroxy group, an epoxy group, an amide group, an amino group and an isocyanate group, and has a melting point of from 100 to 325° C.

The melting point of the fluororesin F is from 100 to 325° C., preferably from 150 to 325° C., more preferably from 170 to 325° C. When the melting point of the fluororesin F is at least the lower limit value in the above range, the heat resistance of the laminate will be excellent. When the melting point of the fluororesin F is at most the upper limit value in the above range, a general-purpose device can be used for producing the laminate, and the adhesion between the layers of the laminate will be excellent.

In a case where the fluororesin F having a relatively low melting point is used, even if the heating temperature at the time of molding is made to be low, the adhesion between the layers in the laminate will be excellent. In this respect, the melting point of the fluororesin F is preferably at least 150° C. and lower than 260° C., more preferably from 170 to 250° C.

In a case where the fluororesin F having a relatively high melting point is used, a laminate having high heat resistance can be obtained, such being preferred. In this respect, the melting point of the fluororesin F is preferably from 260 to 325° C., more preferably from 280 to 325° C.

Here, the melting point of a fluororesin can be adjusted by the types and content proportions of the units constituting the fluororesin, the molecular weight, etc. For example, the melting point tends to increase as the proportion of the units u1 as described later increases.

The melt flow rate of the fluororesin F is preferably from 0.1 to 1,000 g/10 minutes, more preferably from 0.5 to 100 g/10 minutes, further preferably from 1 to 30 g/10 minutes, particularly preferably from 3 to 25 g/10 minutes. When the melt flow rate is at least the lower limit value in the above range, the moldability of the fluororesin F will be excellent. When the melt flow rate is at most the upper limit value in the above range, the mechanical strength of the laminate will be high.

Functional groups f which the fluororesin F has, may be one type, or two or more types. As functional groups f, it is preferred to have carbonyl group-containing groups from the viewpoint of adhesion between the layers in the laminate.

The carbonyl group-containing group may, for example, be a group having a carbonyl group between carbon atoms of a hydrocarbon group, a carbonate group, a carboxy group, a haloformyl group, an alkoxycarbonyl group, an acid anhydride group, etc.

As the hydrocarbon group in the group having a carbonyl group between carbon atoms of the hydrocarbon group, for example, a $C_{2-8}$ alkylene group may be mentioned.

Here, the number of carbon atoms in the above alkylene group is the number of carbon atoms that does not include the carbon atoms in the carbonyl group. The alkylene group may be linear or branched.

The haloformyl group is represented by —C(=O)—X (where X is a halogen atom). The halogen atom in the haloformyl group may be a fluorine atom, a chlorine atom or the like, and a fluorine atom is preferred. That is, as the haloformyl group, a fluoroformyl group (referred to also as a carbonyl fluoride group) is preferred.

The alkoxy group in the alkoxycarbonyl group may be linear or branched, and is preferably a $C_{1-8}$ alkoxy group, particularly preferably a methoxy group or an ethoxy group.

The content of functional groups f in the fluororesin F is preferably from 10 to 60,000, more preferably from 100 to 50,000, further preferably from 100 to 10,000, particularly preferably from 300 to 5,000, to the number of carbon atoms being $1 \times 10^6$ in the main chain of the fluororesin F. When the content of functional groups f is at least the lower limit value in the above range, the adhesion between the layers in the laminate will be further excellent. When the content of functional groups f is at most the upper limit value in the above range, the adhesion between the layers in the laminate will be excellent even if the heating temperature during molding is made to be low.

The content of functional groups f can be measured by a method such as nuclear magnetic resonance (NMR) analysis or infrared absorption spectrum analysis. For example, as described in JP-A2007-314720, by using a method such as infrared absorption spectrum analysis, the proportion (mol %) of the units having functional group f in all units constituting the fluororesin F, is obtained, and from the above proportion, the content of functional groups f can be calculated.

As the fluororesin F, for example, a fluorinated polymer having units having functional group f or terminal groups having functional group f, may be mentioned. Specifically, one having functional groups f introduced to e.g. a polychlorotrifluoroethylene (PCTFE), a copolymer (hereinafter "ethylene/tetrafluoroethylene") having units based on ethylene and units based on tetrafluoroethylene (hereinafter referred to also as "TFE"), an ethylene/chlorotrifluoroethylene (hereinafter referred to also as "CTFE") copolymer (ECTFE), a CTFE/TFE copolymer, a TFE/hexafluoropropylene (hereinafter referred to also as "HFP") copolymer (FEP), a TFE/perfluoro(alkyl vinyl ether) (hereinafter referred to also as "PAVE") copolymer (PFA) or polyvinylidene fluoride (PVdF), may be mentioned. A modified polytetrafluoroethylene having functional groups f introduced, may also be mentioned.

As the modified polytetrafluoroethylene, (i) one having TFE, an extremely small amount of $CH_2=CH(CF_2)_4F$ or $CF_2$=$CFOCF_3$ and an extremely small amount of a monomer having a functional group f copolymerized, (ii) one having TFE and a very small amount of a monomer having a very small amount of a functional group f copolymerized, (iii) one having functional groups f introduced to a polytetrafluoroethylene by e.g. plasma treatment, (iv) one having functional groups f introduced by e.g. plasma treatment to one having TFE and a very small amount of $CH_2$=$CH(CF_2)_4F$ or $CF_2$=$CFOCF_3$ copolymerized, etc. may be mentioned.

As the fluororesin F, PFA having functional groups f, FEP having functional groups f, and ETFE having functional groups f are preferred.

As the fluororesin F, the following fluorinated polymer X is preferred from the viewpoint of excellent adhesion between layers in the laminate.

Fluorinated polymer X: a fluorinated polymer having units (hereinafter referred to also as "units u1") based on TFE or CTFE, units (hereinafter referred to also as "units u2") based on a cyclic hydrocarbon monomer (hereinafter referred to also as "acid anhydride-type monomer") having an acid anhydride group, and units (hereinafter referred to also as "units u3") based on a fluorinated monomer (but excluding TFE and CTFE).

As the monomer constituting units u1, TFE is preferred from the viewpoint of excellent heat resistance.

As the acid anhydride-type monomer, itaconic anhydride (hereinafter referred to also as "IAH"), citraconic anhydride (hereinafter referred to also as "CAH"), 5-norbornene-2,3-dicarboxylic acid anhydride (hereinafter referred to also as "NAH"), maleic anhydride, etc. may be mentioned. As the acid anhydride-type monomer, one type may be used alone, or two or more types may be used in combination.

As the acid anhydride-type monomer, IAH, CAH and NAH are preferred. When any one of IAH, CAH and NAH is used, a fluorinated polymer X having acid anhydride groups can be easily produced without using a special polymerization method (see JP-A-H11-193312) which is required when maleic anhydride is used.

As the acid anhydride-type monomer, IAH and NAH are preferred from such a viewpoint that adhesion between layers in the laminate will be further excellent.

In the fluoropolymer X, there may be a case where some of acid anhydride groups in the units u2 are hydrolyzed, and as a result, units derived from a dicarboxylic acid (itaconic acid, citraconic acid, 5-norbornene-2,3-dicarboxylic acid, maleic acid, etc.) corresponding to an acid anhydride-type monomer may be contained. In the case where units derived from such a dicarboxylic acid are contained, the content of such units shall be included in the content of the units u2.

The fluorinated monomer constituting units u3 is preferably a fluorinated compound having one polymerizable carbon-carbon double bond, and may, for example, be a fluoroolefin (vinyl fluoride, vinylidene fluoride, TFE, HFP, hexafluoroisobutylene, etc. but excluding TFE), PAVE, $CF_2$=$CFOR^{f2}SO_2X^1$ (where $R^{f2}$ is a $C_{1-10}$ perfluoroalkylene group which may contain an etheric oxygen atom between carbon atoms, and $X^1$ is a halogen atom or a hydroxy group), $CF_2$=$CFOR^{f3}CO_2X^2$ (where $R^{f3}$ is a $C_{1-10}$ perfluoroalkylene group which may contain an etheric oxygen atom between carbon atoms, and $X^2$ is a hydrogen atom or a $C_{1-3}$ alkyl group), $CF_2$=$CF(CF_2)_pOCF$=$CF_2$ (where p is 1 or 2.), $CH_2$=$CX^3(CF_2)_qX^4$ (where $X^3$ is a hydrogen atom or a fluorine atom, q is an integer of from 2 to 10, and $X^4$ is a hydrogen atom or a fluorine atom) (hereinafter referred to also as "FAE"), a fluorinated monomer having a ring structure (perfluoro(2,2-dimethyl-1,3-dioxole), 2,2,4-trifluoro-5-trifluoromethoxy-1,3-dioxole, perfluoro(2-methylene-4-methyl-1,3-dioxolane), etc.), etc.

PAVE may be $CF_2$=$CFOR^{f1}$ (wherein $R^{f1}$ is a $C_{1-10}$ perfluoroalkyl group which may contain an etheric oxygen atom between carbon atoms).

As the fluorinated monomer constituting units u3, at least one type selected from the group consisting of HFP, PAVE and FAE is preferred, and PAVE is particularly preferred, from the viewpoint of excellent moldability of the fluorinated polymer X.

As PAVE, $CF_2$=$CFOCF_2CF_3$, $CF_2$=$CFOCF_2CF_2CF_3$ (hereinafter referred to also as "PPVE"), $CF_2$=$CFOCF_2CF_2CF_2CF_3$, $CF_2$=$CFO(CF_2)_8F$, etc., may be mentioned, and PPVE is preferred.

As FAE, $CH_2$=$CF(CF_2)_2F$, $CH_2$=$CF(CF_2)_3F$, $CH_2$=$CF(CF_2)_4F$, $CH_2$=$CF(CF_2)_5F$, $CH_2$=$CF(CF_2)_8F$, $CH_2$=$CF(CF_2)_2H$, $CH_2$=$CF(CF_2)_3H$, $CH_2$=$CF(CF_2)_4H$, $CH_2$=$CF(CF_2)_5H$, $CH_2$=$CF(CF_2)_8H$, $CH_2$=$CH(CF_2)_2F$, $CH_2$=$CH(CF_2)_3F$, $CH_2$=$CH(CF_2)_4F$, $CH_2$=$CH(CF_2)_5F$, $CH_2$=$CH(CF_2)_6F$, $CH_2$=$CH(CF_2)_8F$, $CH_2$=$CH(CF_2)_2H$, $CH_2$=$CH(CF_2)_3H$, $CH_2$=$CH(CF_2)_4H$, $CH_2$=$CH(CF_2)_5H$, $CH_2$=$CH(CF_2)_8H$, etc. may be mentioned.

As FAE, $CH_2$=$CH(CF_2)_{q1}X^4$ (where q1 is from 2 to 6, preferably from 2 to 4) is preferred, and $CH_2$=$CH(CF_2)_2F$, $CH_2$=$CH(CF_2)_3F$, $CH_2$=$CH(CF_2)_4F$, $CH_2$=$CF(CF_2)_3H$ and $CH_2$=$CF(CF_2)_4H$ are more preferred, and $CH_2$=$CH(CF_2)_4F$ (hereinafter referred to also as "PFBE") and $CH_2$=$CH(CF_2)_2F$ (hereinafter referred to also as "PFEE") are particularly preferred.

The preferred proportions of the respective units to the total amount of units u1, units u2 and units u3 in the fluorinated polymer X are as follows.

The proportion of units u1 is preferably from 90 to 99.89 mol %, more preferably from 95 to 99.47 mol %, further preferably from 96 to 98.95 mol %.

The proportion of units u2 is preferably from 0.01 to 3 mol %, more preferably from 0.03 to 2 mol %, further preferably from 0.05 to 1 mol %.

The proportion of units u3 is preferably from 0.1 to 9.99 mol %, more preferably from 0.5 to 9.97 mol %, further preferably from 1 to 9.95 mol %.

When the proportions of the respective units in the fluorinated polymer X are within the above ranges, adhesion between the layers in the laminate will be further excellent.

When the proportion of units u2 is within the above range, the amount of acid anhydride groups in the fluorinated polymer X becomes proper, and the adhesion between the layers in the laminate will be further excellent.

When the proportion of units u3 is within the above range, the moldability of the fluorinated polymer X will be further excellent.

The proportions of the respective units can be calculated by melting NMR analysis, fluorine content analysis, infrared absorption spectrum analysis, etc. of the fluorinated polymer X.

The fluorinated polymer X may have units (hereinafter referred to also as "units u4") based on a non-fluorinated monomer (but excluding an acid anhydride type monomer) in addition to units u1 to u3.

The non-fluorinated monomer is preferably a non-fluorocompound having one polymerizable carbon-carbon double bond, and may, for example, be an olefin (ethylene, propylene, 1-butene, etc.), a vinyl ester (vinyl acetate, etc.), etc. As the non-fluorinated monomer, one type may be used alone, or two or more types may be used in combination.

As the non-fluorinated monomer, ethylene, propylene and 1-butene are preferred, and ethylene is particularly preferred, from the viewpoint of excellent mechanical strength of the fluororesin film.

In a case where the fluorinated polymer X is composed of units u1, units u2, units u3 and units u4, and units u4 are ethylene units, the preferred proportions of the respective units to the total amounts of units u1, units u2, units u3 and units u4, are as follows.

The proportion of units u1 is preferably from 25 to 80 mol %, more preferably from 40 to 65 mol %, further preferably from 45 to 63 mol %.

The proportion of units u2 is preferably from 0.01 to 5 mol %, more preferably from 0.03 to 3 mol %, further preferably from 0.05 to 1 mol %.

The proportion of units u3 is preferably from 0.2 to 20 mol %, more preferably from 0.5 to 15 mol %, further preferably from 1 to 12 mol %.

The proportion of ethylene units is preferably from 20 to 75 mol %, more preferably from 35 to 50 mol %, further preferably from 37 to 55 mol %.

Specific examples of the fluorinated polymer X may be a TFE/NAH/PPVE copolymer, a TFE/IAH/PPVE copolymer, a TFE/CAH/PPVE copolymer, a TFE/IAH/HFP copolymer, a TFE/CAH/HFP copolymer, a TFE/IAH/PFBE/ethylene copolymer, a TFE/CAH/PFBE/ethylene copolymer, a TFE/IAH/PFEE/ethylene copolymer, a TFE/CAH/P FEE/ethylene copolymer, a TFE/IAH/HFP/PFBE/ethylene copolymer, etc.

As the fluorinated polymer X, PFA having functional groups f is preferred, and a TFE/NAH/PPVE copolymer, a TFE/IAH/PPVE copolymer, and a TFE/CAH/PPVE copolymer are more preferred.

The fluoropolymer having functional groups f, such as the fluorinated polymer X, can be produced by a conventional method. In the case of producing a fluorinated polymer by polymerizing monomers, as the polymerization method, a polymerization method using a radical polymerization initiator is preferred.

As the polymerization method, a bulk polymerization method, a solution polymerization method using an organic solvent (a fluorinated hydrocarbon, a chlorinated hydrocarbon, a fluorinated chlorinated hydrocarbon, an alcohol, a hydrocarbon, etc.), a suspension polymerization method using an aqueous medium and, as the case requires, a suitable organic solvent, or an emulsion polymerization method using an aqueous medium and an emulsifier, may be mentioned, and a solution polymerization method is preferred.

As the radical polymerization initiator, an initiator having a half-life of 10 hours at a temperature of from 0 to 100° C. is preferred, and an initiator having the half-life at from 20 to 90° C. is more preferred.

The radical polymerization initiator may be an azo compound (azobisisobutyronitrile, etc.), a non-fluorinated diacyl peroxide (isobutyryl peroxide, octanoyl peroxide, benzoyl peroxide, lauroyl peroxide, etc.), a peroxydicarbonate (diisopropyl peroxydicarbonate, etc.), a peroxyester (tert-butylperoxypivalate, tert-butylperoxyisobutyrate, tert-butylperoxyacetate, etc.), a fluorinated diacyl peroxide (a compound represented by $(Z(CF_2)_rCOO)_2$ (where Z is a hydrogen atom, a fluorine atom or a chlorine atom, and r is an integer of from 1 to 10), etc.), an inorganic peroxide (potassium persulfate, sodium persulfate, ammonium persulfate, etc.), etc.

At the time of polymerization, a chain transfer agent may be used to control the melt viscosity of the fluorinated polymer X. The chain transfer agent may be an alcohol (methanol, ethanol, etc.), a chlorofluorohydrocarbon (1,3-dichloro-1,1,2,2,3-pentafluoropropane, 1,1-dichloro-1-fluoroethane, etc.) or a hydrocarbon (pentane, hexane, cyclohexane, etc.).

The organic solvent to be used in the solution polymerization method may be a perfluorocarbon (perfluorocyclobutane, etc.), a hydrofluorocarbon (1-hydroperfluorohexane etc.), a chlorohydrofluorocarbon (1,3-dichloro-1,1,2,2,3-pentafluoropropane, etc.), a hydrofluoroether (methyl perfluorobutyl ether, etc.), etc. The number of carbon atoms thereof is preferably from 4 to 12.

As the fluororesin F, a fluorinated polymer having a functional group f as a main chain terminal group may be used. The fluorinated polymer having a functional group f as a main chain terminal group can be produced by a method of polymerizing a monomer by using a chain transfer agent or a polymerization initiator which brings about the functional group f during the polymerization of the monomer.

As the chain transfer agent which brings about the functional group f, a chain transfer agent having a carboxy group, an ester bond, a hydroxy group or the like is preferred. Specifically, acetic acid, acetic anhydride, methyl acetate, ethylene glycol, propylene glycol or the like may be mentioned.

As the polymerization initiator which brings about the functional group f, a peroxide-type polymerization initiator such as a peroxycarbonate, a diacyl peroxide or a peroxyester is preferred. Specifically, di-n-propylperoxydicarbonate, diisopropylperoxycarbonate, tert-butylperoxyisopropylcarbonate, bis(4-tert-butylcyclohexyl)peroxydicarbonate, di-2-ethylhexylperoxydicarbonate or the like may be mentioned.

As the resin other than the fluororesin F that may be contained in the resin component a, a thermoplastic resin other than the fluororesin F may be exemplified. As the thermoplastic resin other than the fluororesin F, a crystalline resin, an amorphous resin, or a thermoplastic elastomer may be exemplified.

As the crystalline resin, a polyester resin (polyethylene terephthalate, polybutylene terephthalate, polytrimethylene terephthalate, polyethylene naphthalate, liquid crystal polyester, etc.), a polyolefin resin (polyethylene, polypropylene, polybutylene, acid-modified polyethylene, acid-modified polypropylene, acid modified polybutylene, etc.), a polyoxymethylene, a polyamide, a polyarylene sulfide resin (polyphenylene sulfide, etc.), a polyketone, a polyetherketone, a polyetheretherketone, a polyetherketoneketone, a polyethernitrile, a fluororesin (polytetrafluoroethylene, etc.) other than fluororesin F, or a liquid crystal polymer, may be exemplified.

As the amorphous resin, a styrene type resin (polystyrene, an acrylonitrile styrene resin, an acrylonitrile butadiene styrene resin, etc.), a polycarbonate, a polymethyl methacrylate, a polyvinyl chloride, an unmodified or modified polyphenylene ether, a thermoplastic polyimide, a polyamideimide, a polyetherimide, a polysulfone, a polyethersulfone, or a polyarylate, may be exemplified.

As the thermoplastic elastomer, a polystyrene-type elastomer, a polyolefin-type elastomer, a polyurethane-type elastomer, a polyester-type elastomer, a polyamide-type elastomer, a polybutadiene-type elastomer, a polyisoprene-type elastomer, a fluorinated elastomer (but excluding the fluororesin F), or an acrylonitrile-type elastomer, may be exemplified.

Further, a phenolic resin, a phenoxy type resin or the like may also be used.

As the thermoplastic resin other than the fluororesin F, from the viewpoint of improving the heat resistance of the prepreg, a polyamide, a polyarylene sulfide resin (polyphenylene sulfide, etc.), a polyketone, a polyetherketone, a polyetheretherketone, a polyetherketoneketone, a polyethernitrile, a modified polyphenylene ether, a thermoplastic polyimide, a polyamideimide, a polyetherimide, a polysulfone, a polyethersulfone, or a polyarylate, is preferred.

The proportion of the fluororesin F in the resin component a is preferably at least 50 vol %, more preferably at least 70 vol %, further preferably at least 80 vol %, particularly preferably 100 vol %, to the entire volume of the resin component a, that is, to the total volume of the fluororesin F and resins other than the fluororesin F. When the proportion of the fluororesin F is at least the above lower limit value, it will be easy to obtain a laminate excellent in chemical resistance and wear resistance.

The fiber-reinforced resin layer A may contain only the resin component a, as the matrix resin, or may contain a resin composition having components other than resin mixed to the resin component a.

As components other than resin, an inorganic filler, an organic filler, an organic pigment, a metallic soap, a surfactant, a ultraviolet absorber, a lubricant, a silane coupling agent, and an organic compound (an organic monomer, and an organic oligomer having a polymerization degree of at most 50, etc.), may be exemplified, and an inorganic filler is preferred.

The proportion of the resin component a in the matrix resin of the fiber-reinforced resin layer A is preferably from 70 to 100 vol %, more preferably from 75 to 100 vol %, further preferably from 80 to 100 vol %. When the resin component a is at least the lower limit value in the above range, it will be easy to obtain a laminate excellent in chemical resistance and wear resistance.

The ratio $Q_A$ of the volume of the reinforcing fiber base material to the total volume of the reinforcing fiber base material and the resin component a in the fiber-reinforced resin layer A, is from 0.30 to 0.70, preferably from 0.35 to 0.65, more preferably from 0.40 to 0.60. When the ratio $Q_A$ is at least the lower limit value in the above range, the reinforced fiber molded product will be excellent in wear resistance. When the ratio $Q_A$ is at most the upper limit value in the above range, the adhesion with the substrate will be excellent.

Here, the ratio $Q_A$ can be calculated from the charged amounts and the specific gravities of materials at the time of the production of the prepreg to form the fiber-reinforced resin layer A.

(Substrate B)

The substrate B is a substrate comprising metal, paper, glass or a resin component (hereinafter referred to also as "resin component b") containing a non-fluororesin in an amount of more than 50 vol %. The non-fluororesin (hereinafter referred to also as "resin B") contained in the resin component b is a cured product of a thermosetting resin, or a thermoplastic resin, containing no fluorine atom. In a case where the substrate B comprises the resin component b, the substrate B may further contain reinforcing fibers or may not contain reinforcing fibers.

As the substrate B, a metal substrate, a paper substrate, a glass substrate, a resin substrate comprising the resin component b, or a fiber-reinforced resin substrate comprising the resin component b and reinforcing fibers, may be exemplified.

The metal constituting the metal substrate may be iron, stainless steel, aluminum, copper, brass, nickel, zinc, titanium, or an alloy of such metals.

The thermoplastic resin containing no fluorine atom, as the resin B, is not particularly limited, and one selected from the group consisting of a polyamide, a polyarylene sulfide resin (polyphenylene sulfide, etc.), a polyketone, a polyetherketone, a polyetheretherketone, a polyetherketoneketone, a polyethernitrile, a modified polyphenylene ether, a thermoplastic polyimide, a polyamideimide, a polyetherimide, a polysulfone, a polyethersulfone, and polyarylate, may be exemplified.

As the thermoplastic resin, for aircraft, a polyarylene sulfide, a polyetheretherketone, a polyetherimide, a polyethersulfone, etc., and for automobile, a polyarylene sulfide, a polyamide, a polyphenylene ether, etc. may be mentioned as preferred resins.

The thermosetting resin containing no fluorine atom, as the resin B, is not particularly limited, and one selected from the group consisting of an epoxy resin, a cyanate ester resin, an unsaturated polyester resin, a vinyl ester resin, a phenol resin, a urea melamine resin, a polyimide and a bismaleimide resin, may be exemplified.

From the viewpoint of mechanical properties of the laminate, the thermosetting resin is preferably an epoxy resin or a cyanate ester resin, more preferably an epoxy resin.

As the epoxy resin, a glycidyl ether type epoxy resin (a bisphenol type epoxy resin, a (poly)alkylene glycol type epoxy resin, a phenol novolac type epoxy resin, an ortho-cresol novolac type epoxy resin, etc.), a glycidyl ester type epoxy resin, a glycidyl amine type epoxy resin (N,N,N',N'-tetraglycidyldiaminodiphenylmethane, triglycidyl-p-aminophenol, triglycidyl isocyanurate, etc.), an alicyclic epoxy resin (dicyclopentadiene type, etc.), an epoxy resin having a sulfur atom in the main chain, an urethane-modified epoxy resin, or a rubber-modified epoxy resin, may be exemplified.

As the thermosetting resin, one type may be used alone, or two or more types may be used in combination.

The resin component b may contain a resin other than the resin B. As the resin other than the resin B, a fluororesin other than the fluororesin F, such as PCTFE, ETFE, ECTFE, a CTFE/TFE copolymer, FEP, PFA or polytetrafluoroethylene, may be exemplified.

The proportion of the resin B in the resin component b is more than 50 vol %, preferably at least 70 vol %, more preferably at least 90 vol %, particularly preferably 100 vol %, to the entire volume of the resin component b. When the proportion of the resin B is at least the above lower limit value, it will be easy to obtain a laminate having high mechanical strength.

As the reinforcing fibers to be contained in the substrate B, the same reinforcing fibers as mentioned in the fiber-reinforced resin layer A may be exemplified, and in view of availability, at least one type selected from the group consisting of carbon fibers, glass fibers and aramid fibers, is preferred. As the reinforcing fibers to be contained in the substrate B, one type may be used alone, or two or more types may be used in combination.

The mode of the reinforcing fibers to be contained in the substrate B is not particularly limited, and the same mode as the reinforcing fiber base material mentioned in the fiber reinforced resin layer A may be exemplified.

In a case where a thermosetting resin is to be used as the resin B, the substrate B may further contain a curing agent. The curing agent may be suitably selected according to the type of the thermosetting resin.

In a case where the thermosetting resin is an epoxy resin, as the curing agent, 4,4'-diaminodiphenyl sulfone, dicyandiamide, diaminodiphenylmethane, diaminodiphenyl ether, bisaniline, or benzyldimethylaniline, may be exemplified.

In a case where the thermosetting resin is a cyanate ester resin, as the curing agent, a diepoxy compound is preferred from the viewpoint of improving the toughness of the laminate.

As the curing agent, one type may be used alone, or two or more types may be used in combination.

The substrate B may contain additives such as an inorganic filler, an organic filler, an organic pigment, a metallic soap, a surfactant, an ultraviolet absorber, a lubricant, a silane coupling agent, etc., within such a range that the effects of the present invention will not be impaired.

As the substrate B, a resin substrate composed solely of a thermoplastic resin containing no fluorine atom, a fiber-reinforced resin substrate comprising reinforcing fibers and a resin component containing more than 50 vol % of a cured product of a thermosetting resin containing no fluorine atom, or a fiber-reinforced resin substrate comprising reinforcing fibers and a resin component containing more than 50 vol % of a thermoplastic resin containing no fluorine atom, is preferred.

In a case where the substrate B is a fiber-reinforced resin substrate, the proportion of the resin component b in the matrix resin of the fiber-reinforced resin substrate is preferably from 80 to 100 vol %, more preferably from 85 to 100 vol %, further preferably from 90 to 100 vol %. When the resin component b is least the lower limit value in the above range, it will be easy to obtain a laminate having high mechanical strength.

In a case where the substrate B is a fiber-reinforced resin substrate, the ratio $Q_B$ of the volume of the reinforced fiber substrate to the total volume of the reinforced fiber substrate and the resin component b in the fiber-reinforced resin substrate is preferably from 0.30 to 0.70, more preferably from 0.45 to 0.65, further preferably from 0.40 to 0.60. When the ratio $Q_B$ is at least the lower limit value in the above range, the fiber-reinforced molded product will be excellent in strength physical properties. When the ratio $Q_B$ is at most the upper limit value in the above range, the fiber-reinforced molded product will be excellent in impact resistance.

Here, the ratio $Q_B$ can be calculated from the charged amounts and the specific gravities of materials at the time of the production of the prepreg to form a fiber-reinforced resin substrate.

The structure of the substrate B is not particularly limited, and a sheet shape may be exemplified. The structure of the substrate B may be a columnar shape, a cylindrical shape or a honeycomb structure. In a case where a metal substrate, a paper substrate or a glass substrate is to be used as the substrate B, it is preferred to adopt a honeycomb structure. The substrate having a honeycomb structure means a sheet-shaped substrate having a honeycomb structure in which a plurality of through holes are formed in a plan view.

The substrate B may have a single-layer structure composed of a single substrate, or a multi-layer structure composed of two or more substrates. In a case where the substrate B has a multi-layer structure, it may be a combination of the same type of substrates or a combination of different substrates.

In the laminate of the present invention, at least one outermost layer is made to be the fiber-reinforced resin layer A.

As the laminated construction of the laminate, a construction in which a fiber-reinforced resin layer A and a substrate B are laminated in this order (referred to also as "fiber-reinforced resin layer A/substrate B"; other constructions may be referred to also in the same manner), fiber-reinforced resin layer A/substrate B/fiber-reinforced resin layer A, or fiber-reinforced resin layer A/substrate B/fiber reinforced resin layer A/substrate B, may be exemplified.

The ratio ($d_A/d_B$) of the total thickness $d_A$ of the fiber-reinforced resin layer A to the total thickness $d_B$ of the substrate B in the laminate of the present invention is from 1/99 to 30/70, preferably from 2/98 to 25/75, more preferably from 3/97 to 20/80, further preferably from 5/95 to 15/85. The higher the ratio of the total thickness of the fiber-reinforced resin layer A, the easier it is to obtain a laminate having excellent chemical resistance. The higher the ratio of the substrate B, the easier it is to obtain a laminate having high mechanical strength. Here, the total thickness $d_A$ of the fiber-reinforced resin layer A means the total thickness when the fiber-reinforced resin layer A is present in two or more layers. The same applies to the total thickness $d_B$ of the substrate B.

The total thickness $d_A$ of the fiber-reinforced resin layer A is preferably from 0.01 to 2.0 mm, more preferably from 0.02 to 1.0 mm.

The total thickness $d_B$ of the substrate B is preferably from 0.023 to 198 mm, more preferably from 0.046 to 99 mm, further preferably from 0.2 to 90 mm, particularly preferably from 0.5 to 80 mm.

The adhesive strength between the fiber-reinforced resin layer A and the substrate B is preferably at least 5 N/10 mm, more preferably at least 7 N/10 mm, further preferably at least 8 N/10 mm.

The adhesive strength is measured by the following method. A rectangular test piece having a length of 100 mm and a width of 10 mm is cut out from the laminate. From the one end in the length direction of the test piece to a position of 50 mm, the fiber-reinforced resin layer A and the substrate B are peeled off. Then, with a position of 50 mm from one end in the length direction of the test piece being the center, 90% peeling is conducted at a pulling speed of 50 mm/min using a tensile tester, and the maximum load is taken as the adhesive strength (N/cm).

As the laminate of the present invention, for example, a laminate 1 illustrated in FIG. 1 may be exemplified.

The laminate 1 comprises a substrate 10 and a fiber-reinforced resin layer 20 laminated on the substrate 10. The substrate 10 is composed of nine-layers of fiber-reinforced resin substrate 12 formed by stacking nine prepregs comprising a reinforcing fiber substrate and a resin component b, followed by heating and pressing. In the laminate 1, the fiber-reinforced resin layer 20 is made to be the outermost layer.

In a case where the thickness of the fiber-reinforced resin layer 20 and the thickness of each fiber-reinforced resin substrate 12 are the same, $d_A/d_B$ is 10/90.

(Method for Producing Laminate)

As a method for producing the laminate of the present invention, the following method may be mentioned.

A prepreg having a reinforcing fiber base material impregnated with a resin component a, wherein the ratio $Q_A$ of the reinforcing fiber base material to the total volume of the reinforcing fiber base material and the resin component a is from 0.30 to 0.70 (hereinafter referred to also as "prepreg P1") and the substrate B are laminated. At that time, it is so arranged that at least on the outermost layer, the prepreg P1 is disposed, and the ratio of the total thickness of the prepreg P1 and the total thickness of the substrate B becomes to be from 1/99 to 30/70. Next, the laminated materials are heated and pressed to obtain a laminate.

As the method for producing a laminate of the present invention, the prepreg P1 cut into strips (also called chopped sheets, chopped tapes, chopped UD tapes, etc.) may be laminated in a mold, and then the substrate B may be laminated in the mold so that the prepreg P1 is disposed on the outermost layer, followed by heating and pressing to form a laminate.

At the time of laminating the chopped sheets, the orientation of the fibers may be at random or may be partly changed. In order to obtain an isotropic resurface layer, it is preferred to laminate them at random. In a case where the strength is partly changed, it is preferred to change the orientation of the fiber for each part.

As a method of heating and pressing the laminated materials, a method of hot pressing by means of a hot press machine may be exemplified. Otherwise, the laminate may also be obtained by heating and applying pressure by means of an autoclave.

The surface of the prepreg P1 to be in contact with the substrate B is preferably plasma-treated.

The plasma irradiation device to be used for the plasma treatment is not particularly limited, and devices adopting a high frequency induction system, a capacitive coupling type electrode system, a corona discharge electrode-plasma jet system, a parallel plate type, a remote plasma type, an atmospheric pressure plasma type, an ICP type high density plasma type, etc., may be exemplified.

The gas to be used for the plasma treatment is not particularly limited, and oxygen, nitrogen, a rare gas (argon), hydrogen or ammonia may be exemplified.

The following two embodiments may be exemplified as the method for producing the prepreg P1.

Method (I): A method of applying a powder C containing the resin component a to a reinforcing fiber base material and, as the case requires, heating it to melt at least a part of the resin material a.

Method (II): A method of laminating and hot pressing a resin film containing a resin component a and a reinforcing fiber base material, to melt the resin material a and impregnate it to the reinforcing fiber base material.

D50 of the powder C is preferably from 0.5 to 100 μm, more preferably from 1.0 to 90 μm, further preferably from 5 to 80 μm, still further preferably from 10 to 70 μm. When D50 of the powder C is at least the lower limit value in the above range, the coating property on the reinforcing fiber base material will be excellent. When D50 of the powder C is at most the upper limit value in the above range, the impregnability to the reinforcing fiber base material will be excellent.

The loosely packed bulk density of the powder C is preferably at least 0.05 g/mL, more preferably from 0.05 to 0.5 g/mL, particularly preferably from 0.08 to 0.5 g/mL.

The densely packed bulk density of the powder C is preferably at least 0.05 g/mL, more preferably from 0.05 to 0.8 g/mL, particularly preferably from 0.1 to 0.8 g/mL.

The larger the loosely packed bulk density or the densely packed bulk density, the better the handling efficiency of the powder. Further, the filling rate of the powder in the thermoplastic resin or the like can be increased. When the loosely packed bulk density or the densely packed bulk density is at most the upper limit value in the above range, it can be used in a general-purpose process.

For example, a fluororesin obtained by polymerization or a powder material containing a commercially available fluororesin is pulverized, as the case requires, and then classified (sieved or the like) to obtain a powder C having D50 in the above range. In a case where the fluororesin is produced by solution polymerization, suspension polymerization or emulsion polymerization, the organic solvent or aqueous medium used for the polymerization is removed, and the granular fluororesin is recovered, followed by pulverization or classification (sieving, etc.). In a case where D50 of the granular fluororesin after polymerization is within the desired range, the fluororesin can be used as the powder A as it is. As the pulverization method and classification method of the powder material, the methods described in [0065] to [0069] of WO2016/017801 may be adopted.

Further, as the powder C, a commercially available product may be used.

The method of applying the powder C to the reinforcing fiber base material may be electrostatic coating, thermal spraying, immersion in the dispersion of the powder C, etc.

The liquid medium to be used for the dispersion is not particularly limited, and water; an alcohol such as methanol or ethanol; a nitrogen-containing compound such as N,N-dimethylformamide, N,N-dimethylacetamide or N-methyl-2-pyrrolidone; a sulfur-containing compound such as dimethyl sulfoxide; an ether such as diethyl ether or dioxane; an ester such as ethyl lactate or ethyl acetate; a ketone such as methyl ethyl ketone or methyl isopropyl ketone; a glycol ether such as ethylene glycol monoisopropyl ether; or a cellosolve such as methyl cellosolve or ethyl cellosolve, may be exemplified. As the liquid medium, one type may be used alone, or two or more types may be used in combination.

The solid content concentration in the dispersion is preferably from 5 to 60 mass %, more preferably from 10 to 40 mass %.

The application of the powder by the method (I) and the impregnation by the resin film by the method (II) may be combined. For example, after coating a powder of fluororesin F on a reinforcing fiber base material, a resin film made of another resin other than the fluororesin F is overlaid and hot pressed to melt another resin to impregnate it to the reinforcing fiber base material thereby to produce the prepreg P1.

In a case where the substrate B is a fiber-reinforced resin substrate, a prepreg (hereinafter referred to as "prepreg P2") having a reinforcing fiber substrate impregnated with a resin component b is employed. The production of the prepreg P2 may be conducted in the same manner as the prepreg P1 except that the resin component b is used instead of the resin component a. In a case where the prepreg P2 contains an uncured thermosetting resin as a non-fluororesin, the substrate B of the obtained laminate contains a cured product of the thermosetting resin.

The number of layers in the prepreg P1 or in the prepreg P2 is not particularly limited so long as $d_A/d_B$ satisfies the above range, and may be suitably set depending on the application.

The temperature for the hot pressing of the laminated materials containing the prepreg P1 is preferably at least the melting temperature of the resin component contained in the prepreg P1. In the case of employing the prepreg P2 containing a thermoplastic resin or an uncured thermosetting resin, it is preferred that the temperature is at least the melting point of the thermoplastic resin or at least the curing temperature of the thermosetting resin.

As described above, in the laminate of the present invention, the fiber-reinforced resin layer A and the substrate B are laminated so that the ratio of their respective total thicknesses becomes to be the specific ratio. Thereby, excellent chemical resistance and abrasion resistance are both satisfied. Further, in the laminate of the present invention, at least one outermost layer is made to be the fiber-reinforced resin layer A. Thereby, it is excellent in wear resistance.

The laminate of the present invention is suitably used for applications where wear resistance, chemical resistance and flame retardancy are required. For example, exteriors and interiors of transportation equipment such as automobiles, motorcycles and aircrafts, sliding parts represented by gears and bearings, insulating parts, sports equipment such as rackets and bats, industrial machines, robots, parts of medical equipment, etc. may be mentioned.

Further, the laminate of the present invention may also be used as a vibration-damping member. As members where low vibration is required, for example, rotating parts of motors, rotating parts of compressors, rotating parts of machine tools (lathes, milling machines, etc.), interiors and exteriors of transportation equipment such as automobiles, motorcycles, aircrafts, etc. may be mentioned.

Further, since the laminate of the present invention is excellent in mechanical properties at low temperatures, it can be used for members to be used at extremely low temperatures such as liquid hydrogen tanks.

The laminate of the present invention is not limited to the applications exemplified here.

EXAMPLES

In the following, the present invention will be described specifically with reference to Examples, but the present invention is not limited to the following description. Ex. 1, 5 to 7 and 16 are Examples of the present invention, and Ex. 2 to 4, 8, 9, and 17 are Comparative Examples. Further, Ex. 10 to 15 are Reference Examples.

[Measurement Methods]

With respect to fluororesins and powders, various measurement methods will be shown below.

(1) Copolymer Composition

In the copolymer composition of a fluororesin, the proportion (mol %) of units derived from NAH was determined by the following infrared absorption spectrum analysis. The proportions of other units were obtained by melt NMR analysis and fluorine content analysis.

<Proportion (Mol %) of Units Derived from NAH>

A fluororesin was press-molded to obtain a film having a thickness of 200 μm, which was then analyzed by infrared spectroscopy to obtain an infrared absorption spectrum. In the infrared absorption spectrum, an absorption peak of units derived from NAH in the fluororesin appears at 1,778 $cm^{-1}$. The absorbance of the absorption peak was measured, and by using the molar extinction coefficient of NAH being 20810 $mol^{-1} \cdot cm^{-1}$, the proportion of units derived from NAH in the fluorinated polymer was obtained.

(2) Melting Point (° C.)

Using a differential scanning calorimeter (DSC device) manufactured by Seiko Denshi KK, the melting peak when a fluorinated polymer was heated at a rate of 10° C./min, was recorded, and the temperature (° C.) corresponding to the maximum value was taken as the melting point (Tm).

(3) Mfr (g/10 Minutes)

Using a melt indexer manufactured by Techno Seven Co., Ltd., the mass (g) of a fluorinated polymer flowing out from a nozzle having a diameter of 2 mm and a length of 8 mm in 10 minutes (unit time) under the following temperature and load, was measured and taken as MFR.

(4) D10, D50, D90 and D100 of the Powder

Using a laser diffraction/scattering type particle size distribution measuring device (LA-920 measuring device) manufactured by Horiba Ltd., a resin powder was dispersed in water, and the particle size distribution was measured, whereupon D10 (μm), D50 (μm), D90 (μm) and D100 were calculated.

(5) Loosely Packed Bulk Density and Densely Packed Bulk Density

The loosely packed bulk density and the densely packed bulk density of a powder were measured by the methods described in [0117] and [0118] of WO2016/017801.

Synthesis Example 1

Fluororesin F-1 was produced in the same manner as in Example 5 in WO2016/006644. The proportions of the respective monomer units in the fluororesin F-1 were TFE units/E units/$CH_2$=$CH(CF_2)_2F$ units/IAH units (molar ratio)=54.7/42.8/2.1/0.4. Here, E units represent ethylene units. The melting point of the fluororesin F-1 was 240° C., MFR (297° C., load 49N) was 20.6 g/10 minutes, and the specific gravity was 1.76.

Synthesis Example 2

A polymerization tank equipped with a stirrer having an inner volume of 430 L was degassed, and 237.2 kg of 1-hydrotridecafluorohexane, 49.5 kg of 1,3-dichloro-1,1,2,2,3-pentafluoropropane (manufactured by Asahi Glass Co., Ltd., AK225cb, hereinafter referred to as "AK225cb"), 122 kg of HFP and 1.31 kg of $CH_2$=$CH(CF_2)_4F$ (PFBE) were charged, and the inside of the polymerization tank was heated to 66° C., whereupon the pressure was raised to 1.5 MPa [gauge] by a mixed gas of TFE and ethylene (TFE/ethylene=89/11 (molar ratio)). As a polymerization initiator, 2.5 L of a 1-hydrotridecafluorohexane solution containing 2 mass % of tert-butylperoxypivalate was charged to initiate the polymerization. During the polymerization, a monomer mixed gas of TFE and ethylene (TFE/ethylene=54/46 (molar ratio)) was continuously charged so as to keep the pressure to be constant. Further, PFBE in an amount corresponding to 1 mol % and IAN in an amount corresponding to 0.4 mol % were continuously charged to the total number of mols of TFE and ethylene charged during the polymerization. After 9.3 hours from the start of polymerization, when 29 kg of the monomer mixed gas was charged, the internal temperature of the polymerization tank was lowered to 25° C., and the pressure was purged to normal pressure.

The obtained slurry-like fluororesin F-2 was put into an 860 L granulation tank charged with 300 kg of water, and the temperature was raised to 105° C. with stirring to granulate while distilling off the solvent. The obtained granulated product was dried at 150° C. for 15 hours to obtain 33.2 kg of dried granules of fluororesin F-2.

The proportions of the respective monomer units in the fluororesin F-2 were TFE units/HFP units/PFBE units/IAH units/E units=46.2/9.4/1.0/0.4/43.0 (molar ratio). The content of the functional groups f was 3,000 per 1×$10^6$ carbon atoms in the main chain of the fluororesin F-2. The melting point of the fluororesin F-2 was 170° C., MFR (250° C., load 21.2N) was 4.4 g/10 minutes, and the specific gravity was 1.75.

[Polyamide Resins]

Polyamide resin D-1: Polyamide 6 (UBE Nylon 1022B, manufactured by Ube Industries, Ltd., specific gravity: 1.14).

Polyamide resin D-2: Polyamide composed of an amine having 9 carbon atoms and terephthalic acid (GENESTAR N1000A, manufactured by Kuraray Co., Ltd., specific gravity: 1.14).

[Bending Strength]

Using a tensile compression tester "STROGRAPH R-2" manufactured by Toyo Seiki Seisaku-sho, Ltd., the bending strength of a molded product was measured under the conditions of a load cell rating of 1,000 kg, a speed of 5 mm/min and a fulcrum distance of 8 cm.

[Wear Resistance]

Using a friction wear tester manufactured by Orientec Co., Ltd., a test was carried out by the Matsubara-type friction measurement method (cylindrical plane type O-ring type) in accordance with JIS K7218. At room temperature, to a test piece, a ring (material: S45Cs (1.5S), contact area: 2 cm$^2$) as a mating material was brought into contact under conditions of pressure: 0.37 MPa, rotation speed: 0.5 m/sec and test time: 1 hour, whereby the wear amount of the test piece was measured. Also with respect to a case where the pressure at the time of bringing the ring into contact with the test piece was changed to be 1.47 MPa, the wear amount of the test piece was measured in the same manner.

[Vibration Damping Characteristics]

Figure 2:
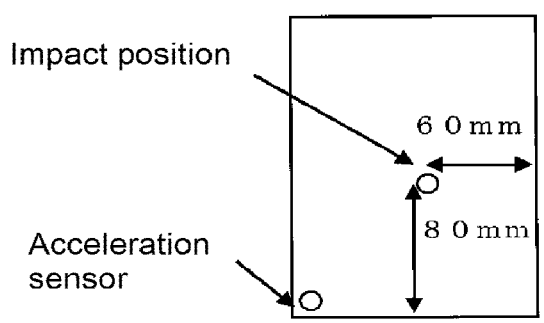
FIG. 2 is a diagram showing a mounting position of an acceleration sensor.

An acceleration sensor was attached to a suspended test piece (190 mm×140 mm), and a frequency response function was measured by an FFT analyzer from the force when the test piece was struck and oscillated by an impact hammer and the acceleration of the test piece. The loss coefficient was calculated by applying the half-width method to the resonance peak of the measured frequency response function. The measurement was conducted 3 times, and the primary and secondary loss coefficients were calculated. The test piece was suspended via a thread using an instant adhesive. The mounting position of the acceleration sensor was as shown in FIG. 2 below.

The measuring device used was as follows.
Impact hammer: 086B01, manufactured by PCB company
Acceleration sensor: S04SG2, manufactured by Fuji Ceramics Corporation
Charge amplifier: 2635, manufactured by B&K company
FFT analyzer: DS-2104, manufactured by Ono Sokki Co., Ltd Production Example 1

Fluororesin F-1 was pulverized by a freeze pulverizer TPH-01 manufactured by AS ONE Corporation to obtain a powder having D50 of 54 μm. Carbon cloth (manufactured by Sunlight Co., Ltd., plain weave CF3000, thickness: 0.25 mm, specific gravity: 1.80) was cut into a size of 10 cm in length×10 cm in width. Fluororesin F-1 powder was electrostatically coated on the cut carbon cloth, so that the ratio $Q_A$ became to be 0.50. Then, by heating at 260° C. for 3 minutes by a hot air circulation dryer, prepreg P1-1 was obtained.

Production Example 2

Using a single-screw extruder (VS-30, manufactured by Tanabe Plastics Machinery Co., Ltd.) and a T-die with a width of 400 mm, polyamide resin D-1 was extrusion-molded at a preset resin temperature of 260° C., a rotation speed of 50 rpm and a line speed of 2.0 m/min, to obtain a polyamide film having a thickness of 50 μm. From the polyamide film, two films were cut out in a size of 10 cm×10 cm and laminated on both sides of a carbon cloth (manufactured by Sunlight Co., Ltd. plain weave CF3000, thickness: 0.25 mm, specific gravity: 1.80), and then press-molded by using a melt heat press (manufactured by Tester Sangyo Co., Ltd.) under conditions of a temperature of 240° C., a pressure of 1 MPa and a pressing time of 3 minutes, to obtain prepreg P2-1.

Ex. 1

Nine sheets of prepreg P2-1 were laminated, and further one sheet of prepreg P1-1 was laminated as the outermost layer thereon, followed by press molding by using a melt heat press (manufactured by Tester Sangyo Co., Ltd.) under conditions of a temperature of 260° C., a preheating time of 10 minutes, a pressure of 10 MPa and a pressing time of 5 minutes to obtain a laminate (fiber-reinforced molded product) having a thickness of 2.5 mm.

Ex. 2

Using a single-screw extruder (VS-30, manufactured by Tanabe Plastics Machinery Co., Ltd.) and a T-die with a width of 400 mm, fluororesin F was extrusion-molded at a set resin temperature of 280° C., a rotation speed of 57 rpm and a line speed of 1.1 m/min, to obtain a fluororesin film E-1 having a thickness of 50 μm.

Ten sheets of prepregs P2-1 were laminated, and further one sheet of fluororesin film E-1 was laminated as the outermost layer thereon, followed by press molding by using a melt heat press (manufactured by Tester Sangyo Co., Ltd.) under conditions of a temperature of 260° C., a preheating time of 10 minutes, a pressure of 10 MPa and a pressing time of 5 minutes, to obtain a laminate (fiber-reinforced molded product) having a thickness of 2.5 mm.

Ex. 3

A laminate (fiber-reinforced molded product) was obtained in the same manner as in Ex. 1 except that, as the outermost layer, prepreg P2-1 was laminated instead of prepreg P1-1.

Ex. 4

A laminate (fiber-reinforced molded product) was obtained in the same manner as in Ex. 1 except that 5 sheets of prepreg P2-1 and 5 sheets of prepreg P1-1 were alternately laminated so that the upper outermost layer became to be prepreg P1-1.

The wear resistance and bending strength of the outermost layer of the laminate obtained in each Ex. were evaluated. Table 1 shows the laminated structure and the evaluation results of each Ex.

TABLE 1

|  | Ex. 1 | Ex. 2 | Ex. 3 | Ex. 4 |
| --- | --- | --- | --- | --- |
| Outermost layer | P1-1 | E-1 | P2-1 | P1-1 |
| Lower layer | P2-1 (9 sheets) | P2-1 (10 sheets) | P2-1 (9 sheets) | Alternately laminated layers of P2-1 (5 sheets) and P1-1 (4 sheets) |
| dA/dB | 10/90 | — | 0/100 | 50/50 |
| Abrasion amount [mg] of outermost layer (measurement pressure: 0.37 MPa) | 0.3 | 0.9 | 0.8 | 0.3 |

TABLE 1-continued

|  | Ex. 1 | Ex. 2 | Ex. 3 | Ex. 4 |
|---|---|---|---|---|
| Abrasion amount [mg] of outermost layer (measurement pressure: 1.47 MPa) | 8.2 | 17.2 | 21.6 | 9.2 |
| Bending strength [MPa] of molded product | 570 | 570 | 560 | 440 |

As shown in Table 1, the laminate in Ex. 1 satisfying the conditions specified in the present invention was excellent in wear resistance with a small wear amount of the outermost layer, as compared with the laminate in Ex. 2 in which the outermost layer was a fluororesin film or with the laminate using prepreg P2-1 as the outermost layer. In addition, the laminate in Ex. 1 had higher bending strength and higher mechanical strength as compared with the laminates in Ex. 2 and 3 and as compared with Ex. 4 in which the ratio of the total thickness of the fiber-reinforced resin layer A was too high.

Ex. 5

Using NAH (Nadic anhydride, manufactured by Hitachi Chemical Co., Ltd.) and PPVE ($CF_2=CFO(CF_2)_3F$, manufactured by Asahi Glass Co., Ltd.), fluorinated polymer F-3 was produced by the procedure disclosed in [0123] of WO2016/017801. The copolymer composition of the fluorinated polymer F-3 was NAH/TFE units/PPVE units=0.1/97.9/2.0 (mol %). The melting point of the fluorinated polymer A-3 was 300° C., MFR (372° C., load 49N) was 17.6 g/10 minutes, the average particle size was 1,554 μm, and the specific gravity was 2.13.

Using a pin mill (M-4 type, manufactured by Seishin Enterprise Co., Ltd.), the fluorinated resin F-3 was crushed under the condition of a rotation speed of 5,000 rpm, and classified by a circular vibrating sieve machine (KGO-1000 type, manufactured by Seishin Enterprise Co., Ltd., sieve opening: 212 μm) to obtain a powder. D10 of the powder was 3.6 μm, D50 was 21.1 μm, D90 was 99.4 μm, D100 was 181.9 μm, and the loosely packed bulk density was 0.524 g/mL and the densely packed bulk density was 0.695 g/m L.

Carbon cloth (manufactured by Sunlight Co., Ltd., plain weave CF3000, thickness: 0.25 mm, specific gravity: 1.80) was cut into a size of 10 cm in length×10 cm in width. To the surface of the cut carbon cloth, the obtained powder of fluorinated resin F-3 was uniformly applied by electrostatic coating so that the ratio $Q_A$ became to be 0.50. Then, the hot air circulation dryer was heated at 400° C. for 3 minutes to impregnate the powder of the fluorinated resin F-3 to obtain prepreg P1-2 having a thickness of 250 μm.

The polyamide resin D-2 was dried at 120° C. for 6 hours by using a vacuum dryer, and then press-molded by using a melt heat press (manufactured by Tester Sangyo Co., Ltd.) under conditions of temperature: 330° C., preheating: 5 minutes, pressure: 10 MPa, pressing time: 5 minutes, to obtain a press plate G-1 having a thickness of 2.5 mm.

On the press plate G-1, prepreg P1-2 was laminated, followed by press molding by using a melt heat press (manufactured by Tester Sangyo Co., Ltd.) under conditions of temperature: 330° C., preheating: 5 minutes, pressure: 5 MPa, and pressing time: 5 minutes, to obtain a multi-layered laminate having a thickness of 2.5 mm.

The obtained laminate was excellent in wear resistance and slipperiness of the outermost layer and had high mechanical strength.

Ex. 6

The fluororesin F-2 was pulverized by a freeze pulverizer TPH-01 manufactured by AS ONE Corporation to obtain a powder having D50 of 57 μm. Carbon cloth (manufactured by Sunlite Co., Ltd., plain weave CF3000, thickness: 0.25 mm, specific gravity: 1.80) was cut into a size of 190 mm in length×140 mm in width. On the cut carbon cloth, the fluororesin F-2 powder was electrostatically coated so that the ratio $Q_A$ became to be 0.50. Next, by heating at 240° C. for 3 minutes by a hot air circulation dryer, prepreg P1-3 was obtained. Using, as prepreg P2-2, a thermosetting prepreg (product number: TR3110 381 GMX, manufactured by Mitsubishi Rayon Co., Ltd.), 8 sheets of P2-2 were laminated, and then 1 sheet of prepreg P1-3 was laminated as each of the lowermost layer and the uppermost layer, followed by press molding by using a melt heat press (manufactured by Tester Sangyo Co., Ltd.) under conditions of temperature: 240° C., preheating: 5 minutes, pressure: 5 MPa, pressing time: 10 minutes, to obtain a multilayered laminate having a thickness of 2.5 mm and a size of 190 mm×140 mm. With respect to the obtained laminate, the vibration damping property was measured. Table 2 shows the loss coefficient and the resonance frequency.

Ex. 7

Eight sheets of prepreg P2-1 were laminated, and one sheet of prepreg P1-1 was laminated at each of the lowermost layer and the uppermost layer, followed by press molding by using a melt heat press (manufactured by Tester Sangyo Co., Ltd.) under conditions of temperature: 260° C., preheating: 5 minutes, pressure: 5 MPa, pressing time: 5 minutes, to obtain a multilayered laminate having a thickness of 2.5 mm and a size of 190 mm×140 mm. With respect to the obtained laminate, the vibration damping property was measured. Table 2 shows the loss coefficient and the resonance frequency.

Ex. 8

Ten sheets of prepreg P2-2 were laminated to obtain a laminate in the same manner as in Ex. 6.

With respect to the obtained laminate, the vibration damping property was measured. Table 2 shows the loss coefficient and the resonance frequency.

Ex. 9

Ten sheets of prepreg P2-1 were laminated to obtain a laminate in the same manner as in Ex. 7.

With respect to the obtained laminate, the vibration damping property was measured. Table 2 shows the loss coefficient and the resonance frequency.

TABLE 2

|  | Ex. 6 | Ex. 7 | Ex. 8 | Ex. 9 |
|---|---|---|---|---|
| Outermost layer | P1-3 (1 sheet) | P1-1 (1 sheet) | P2-2 (1 sheet) | P2-1 (1 sheet) |
| Intermediate layer | P2-2 (8 sheets) | P2-1 (8 sheets) | P2-2 (8 sheets) | P2-1 (8 sheets) |
| Lowermost layer | P1-3 (1 sheet) | P1-1 (1 sheet) | P2-2 (1 sheet) | P2-1 (1 sheet) |

TABLE 2-continued

|  | Ex. 6 | Ex. 7 | Ex. 8 | Ex. 9 |
|---|---|---|---|---|
| dA/dB | 20/80 | 20/80 | 0/100 | 0/100 |
| Primary loss coefficient | 0.018 | 0.04 | 0.008 | 0.010 |
| (Resonance frequency) | (106 Hz) | (94 Hz) | (148 Hz) | (144 Hz) |
| Secondary loss coefficient | 0.023 | 0.01 | 0.006 | 0.002 |
| (Resonance frequency) | (333 Hz) | (346 Hz) | (376 Hz) | (377 Hz) |

Since Ex. 6 has a higher loss coefficient than Ex. 8, and Ex. 7 has a higher loss coefficient than Ex. 9, it was possible to obtain a molded product having a higher vibration damping property.

Ex. 10

A carbon fiber cloth (CF3000, manufactured by Sunlight Co., Ltd.) was cut into 10 sheets with a size of 25 cm in length and 25 cm in width.

Using a single-screw extruder (VS-30, manufactured by Tanabe Plastics Machinery Co., Ltd.) and a T-die with a width of 400 mm, fluororesin F-1 was extrusion-molded at a preset resin temperature of 240° C., a rotation speed of 56 rpm and a line speed of 1.0 m/min, to obtain a fluororesin film E-2 having a thickness of 50 μm.

The prepared film E-2 was cut into 20 sheets with a size of 25 cm in length and 25 cm in width. In a mold, 20 sheets of the film and 10 sheets of carbon fiber cloth were laminated in the order of film/carbon fiber cloth/film/film/carbon fiber cloth/film/film/carbon fiber cloth/film (repeated).

Using a melt heat press (manufactured by Tester Sangyo Co., Ltd.), the mold was pressed at a temperature of 240° C., preheating for 10 minutes and pressure of 4 MPa for 5 minutes. After that, the mold was cooled to obtain a flat plate having a thickness of 2.3 mm. The bending strength of the obtained flat plate was measured. The results are shown in Table 3.

Ex. 11

Using the fluororesin film E-1, a flat plate was obtained in the same manner as in Ex. 10. Here, the hot press temperature was adjusted to be 260° C. Table 3 shows the measurement results of the bending strength.

Ex. 12

Using, as a fluororesin, fluororesin F-4 having no functional group (Fluon LM730A, manufactured by Asahi Glass Co., Ltd.), a fluororesin film E-3 was obtained in the same manner as in Ex. 2. Using the obtained fluororesin film E-3, a flat plate was prepared in the same manner as in Ex. 11. Table 3 shows the measurement results of the bending strength.

Ex. 13

A carbon fiber cloth (CF3000, manufactured by Sunlight Co., Ltd.) was left to stand in an oven heated to 300° C. for 15 minutes for pretreatment. The pretreated carbon fiber cloth was cut into 10 sheets with a size of 25 cm in length and 25 cm in width.

Using the cut out carbon fiber cloth, a flat plate was obtained in the same manner as in Ex. 10. Table 3 shows the measurement results of the bending strength.

Ex. 14

In the same manner as in Ex. 13, a carbon fiber cloth was pretreated, and in the same manner as in Ex. 11, a flat plate was obtained. Table 3 shows the measurement results of the bending strength and the vibration damping property.

Ex. 15

In the same manner as in Ex. 13, a carbon fiber cloth was pretreated, and in the same manner as in Ex. 12, a flat plate was obtained. Table 3 shows the measurement results of the bending strength.

TABLE 3

|  | Ex. 10 | Ex. 11 | Ex. 12 | Ex. 13 | Ex. 14 | Ex. 15 |
|---|---|---|---|---|---|---|
| Bending strength | 139 | 160 | 78 | 211 | 199 | 115 |
| Primary loss coefficient | — | — | — | — | 0.044 | — |
| (Resonance frequency) |  |  |  |  | (94 Hz) |  |
| Secondary loss coefficient | — | — | — | — | 0.01 | — |
| (Resonance frequency) |  |  |  |  | (346 Hz) |  |

Ex. 10, 11, 13 and 14 had better bending strength than Ex. 12, and 15.

Further, the bending strength in Ex. 13 in which the pretreatment of the carbon fiber was conducted, was better than in Ex. 10 in which the pretreatment was not conducted, and the bending strength in Ex. 11 was better than in Ex. 14, and thus, it was found possible to make the bending strength high by conducting the pretreatment.

The flat plate obtained in Ex. 14 was laminated with an aluminum plate (A5052) having a thickness of 10 mm in a mold, and by using a melt heat press (manufactured by Tester Sangyo Co., Ltd.), the mold was pressed at a temperature of 240° C., preheating for 10 minutes, under a pressure of 4 MPa for 5 minutes. Then, the mold was cooled to obtain a laminate. The obtained laminate was excellent in vibration damping properties and had high strength.

Ex. 16

After laminating nine sheets of P2-2, one sheet of prepreg P1-3 was laminated at the uppermost layer, followed by press molding by using a melt heat press (manufactured by Tester Sangyo Co., Ltd.) under conditions of temperature: 240° C., preheating: 5 minutes, pressure: 5 MPa and pressing time: 10 minutes, to obtain a multilayered laminate having a thickness of 2.5 mm and a size of 190 mm×140 mm. The wear resistance and bending strength tests were conducted in the same manner as in Ex. 1.

The results are shown in Table 4. The volume-based wear amount was calculated by using the specific gravity of the resin component of the prepreg P2-2 being 1.48, and the specific gravity of the fluororesin F-2 being 1.75.

Ex. 17

The flat plate obtained in Ex. 8 was tested for wear resistance and bending strength in the same manner as in Ex. 16.

The results are shown in Table 4.

TABLE 4

|  | Ex. 16 | Ex. 17 |
|---|---|---|
| Outermost layer | P1-3 | P2-2 |
| Lower layer | P2-2 (9 sheets) | P2-2 (9 sheets) |
| dA/dB | 10/90 | 0/100 |

TABLE 4-continued

|  | Ex. 16 | Ex. 17 |
|---|---|---|
| Wear amount [cm³] of outermost layer (measurement pressure: 1.47 MPa) | 0.09 | 0.12 |
| Dynamic friction coefficient | 0.18 | 0.4 |
| Bending strength [MPa] of molded product | 700 | 700 |

As compared to Ex. 17, in Ex. 16, the bending strength was equal, but the friction coefficient was low, and the wear resistance was excellent.

Ex. 18

Using the test pieces in Ex. 7 and 9, the flame retardancy was evaluated in accordance with UL94V, whereby it was found that in Ex. 7, the flame retardancy was superior.

This application is a continuation of PCT Application No. PCT/JP2019/015683, filed on Apr. 10, 2019, which is based upon and claims the benefit of priority from Japanese Patent Application No. 2018-078705 filed on Apr. 16, 2018 and Japanese Patent Application No. 2018-139612 filed on Jul. 25, 2018. The contents of those applications are incorporated herein by reference in their entireties.

REFERENCE SYMBOLS

1: Laminate, 10: Substrate, 12: Fiber-reinforced resin substrate, 20: Fiber-reinforced resin layer.

What is claimed is:

1. A laminate comprising:
   at least one fiber-reinforced resin layer which comprises a reinforcing fiber base material and a resin component comprising at least 50 vol % of a fluororesin, wherein the ratio of the volume of the reinforcing fiber base material to the total volume of the reinforcing fiber base material and the resin component is from 0.30 to 0.70; and
   a plurality of substrates each of which is a layer which comprises more than 50 vol % of a non-fluororesin and contacts each other,
   wherein at least one outermost layer of the laminate is the fiber-reinforced resin layer,
   wherein the ratio of the total thickness of the at least one fiber-reinforced resin layer to the total thickness of the plurality of substrates is from 1/99 to 30/70,
   wherein the fluororesin is a melt-moldable fluororesin having at least one functional group selected from the group consisting of a carbonyl group-containing group, a hydroxy group, an epoxy group, an amide group, an amino group and an isocyanate group, and having a melting point of from 100 to 325° C., and
   wherein the non-fluororesin is a cured product of a thermosetting resin containing no fluorine atom or a thermoplastic resin containing no fluorine atom.

2. The laminate according to claim 1, wherein the melting point of the fluororesin is at least 150° C. and lower than 260° C.

3. The laminate according to claim 1, wherein the melting point of the fluororesin is at least 260° C. and lower than 325° C.

4. The laminate according to claim 1, wherein the fluororesin is a fluorinated polymer comprising units based on tetrafluoroethylene or chlorotrifluoroethylene, units based on a cyclic hydrocarbon monomer having an acid anhydride group, and units based on a fluorinated monomer which is not tetrafluoroethylene or chlorotrifluoroethylene.

5. The laminate according to claim 1, wherein reinforcing fibers of the reinforcing fiber base material contained in the fiber-reinforced resin layer are selected from the group consisting of carbon fibers, glass fibers, aramid fibers and combinations thereof.

6. The laminate according to claim 1, wherein the substrate is at least one selected from the group consisting of: a resin substrate composed solely of a thermoplastic resin containing no fluorine atom; a fiber-reinforced resin substrate comprising reinforcing fibers and a resin component comprising more than 50 vol % of a cured product of a thermosetting resin containing no fluorine atom; and a fiber-reinforced resin substrate comprising reinforcing fibers and a resin component comprising more than 50 vol % of a thermoplastic resin containing no fluorine atom.

7. The laminate according to claim 1, wherein the thermoplastic resin containing no fluorine atom is selected from the group consisting of a polyamide, a polyarylene sulfide resin, a polyketone, a polyetherketone, a polyetheretherketone, a polyetherketoneketone, a polyethernitrile, a modified polyphenylene ether, a thermoplastic polyimide, a polyamideimide, a polyetherimide, a polysulfone, a polyethersulfone, a polyarylate and combinations thereof.

8. The laminate according to claim 1, wherein the thermosetting resin containing no fluorine atom is selected from the group consisting of an epoxy resin, a cyanate ester resin, an unsaturated polyester resin, a vinyl ester resin, a phenol resin, a urea melamine resin, a polyimide, a bismaleimide resin and combinations thereof.

9. The laminate according to claim 1, wherein the structure of the substrate is a columnar shape, a cylindrical shape or a honeycomb structure.

10. The laminate according to claim 1, wherein the adhesive strength between the fiber-reinforced resin layer and the substrate is at least 5 N/cm.

11. The laminate according to claim 1, wherein the ratio of the total thickness of the fiber-reinforced resin layer to the total thickness of the substrate is from 1/99 to 25/75.

12. The laminate according to claim 1, where in the substrate further comprises reinforcing fibers.

13. The laminate according to claim 12, wherein the reinforcing fibers contained in the substrate are selected from the group consisting of carbon fibers, glass fibers, aramid fibers and combinations thereof.

14. A vibration-damping member made of the laminate as defined claim 1.

15. A method for producing a laminate, comprising:
   laminating:
      at least one prepreg having a reinforcing fiber base material impregnated with a resin component comprising at least 50 vol % of a fluororesin, wherein the ratio of the volume of the reinforcing fiber base material to the total volume of the reinforcing fiber base material and the resin component is from 0.30 to 0.70; and
      a plurality of substrates each of which is a layer which comprises more than 50 vol % of a non-fluororesin and contacts each other,
      so that the prepreg is disposed such that the prepreg is at least one outermost layer of the laminate, and the ratio of the total thickness of the at least one prepreg to the total thickness of the plurality of substrates becomes to be from 1/99 to 30/70; and
   heating and pressing the at least one prepreg and the at least one substrate,
   wherein the fluororesin is a melt-moldable fluororesin having at least one functional group selected from the group consisting of a carbonyl group-containing group, a hydroxy group, an epoxy group, an amide group, an amino group and an isocyanate group, and having a melting point of from 100 to 325° C., and wherein the non-fluororesin is an uncured thermosetting resin containing no fluorine atom or thermoplastic resin containing no fluorine atom.

16. The method for producing a laminate according to claim 15, wherein a surface of the prepreg in contact with the substrate is plasma-treated.

17. The method for producing a laminate according to claim 15, wherein the ratio of the total thickness of the fiber-reinforced resin layer to the total thickness of the substrate is from 1/99 to 25/75.

\* \* \* \* \*